United States Patent [19]

Watanabe

[11] 4,442,331
[45] Apr. 10, 1984

[54] METHOD AND APPARATUS OF INDUCTION HEATING A METALLIC ELONGATED MATERIAL HAVING DIFFERENT THICKNESS SECTIONS

[75] Inventor: Yasuo Watanabe, Kita-Kyushu, Japan

[73] Assignee: Dai Ichi High Frequency Company, Ltd., Tokyo, Japan

[21] Appl. No.: 341,088

[22] Filed: Jan. 20, 1982

[30] Foreign Application Priority Data

Jan. 22, 1981 [JP] Japan .................................. 56-8220

[51] Int. Cl.³ .......................... H05B 6/06; H05B 6/40
[52] U.S. Cl. .............................. 219/10.43; 219/10.57;
219/10.71; 219/10.77; 219/10.79
[58] Field of Search ................ 219/10.41, 10.43, 10.57,
219/10.69, 10.71, 10.75, 10.77, 10.79, 10.49 R,
8.5; 148/145, 146, 147, 150, 154; 266/124, 125, 129

[56] References Cited

U.S. PATENT DOCUMENTS

| | | | |
|---|---|---|---|
| 1,981,631 | 11/1934 | Northrup | 219/10.77 |
| 2,452,197 | 10/1948 | Kennedy | 219/10.43 X |
| 2,752,472 | 6/1956 | Emerson | 219/10.79 |
| 3,827,275 | 8/1974 | Suttan et al. | 219/10.57 X |
| 4,093,839 | 6/1978 | Moliterno et al. | 219/10.41 X |
| 4,100,387 | 7/1978 | Reinke et al. | 219/10.57 |
| 4,142,663 | 3/1979 | Blatnik et al. | 219/8.5 X |
| 4,317,978 | 3/1982 | Nebesar | 219/10.71 |

FOREIGN PATENT DOCUMENTS

690659 10/1979 U.S.S.R. ............................ 219/10.79

Primary Examiner—B. A. Reynolds
Assistant Examiner—Philip H. Leung
Attorney, Agent, or Firm—L. Lawton Rogers, III

[57] ABSTRACT

The present invention relates to a method of uniformly induction heating a metallic elongated material having different thickness sections seen in the longitudinal direction, and more particularly relates to a method of ensuring substantially uniform heating for a metallic elongated material over the whole length thereof irrespective of the existence of different thickness of diameter section(s). Specifically, an inductor for practicing the method of the invention is constructed in the form of a multi-turn coil which is adapted to be separated to a certain number of coil segments corresponding to the geometrical configuration of the metallic elongated material. Uniform distribution of temperature over the metallic elongated material is achieved by properly program controlling power supply to the respective turns of the coil and thereby controlling a heating time thereof, while the inductor itself is maintained as fixed. Thus, irrespective of the irregular stepped configuration of the metallic elongated material substantially uniform heating is ensured by preparing an adequate program corresponding to it.

14 Claims, 11 Drawing Figures

METHOD AND APPARATUS OF INDUCTION HEATING A METALLIC ELONGATED MATERIAL HAVING DIFFERENT THICKNESS SECTIONS

BACKGROUND OF THE INVENTION

One of the hitherto known methods of heating a metallic elongated material having different thickness sections is such that said metallic elongated material is placed and heated in a heating furnace. However it has been found that this conventional method should be preferably unacceptable, because during the heating in the furnace the metallic elongated material is coated with oxide film over the outer surface thereof, resulting in reduced dimensional accuracy, surface injury or damage in later hot working or irregular hardening due to reduced thermal conduction.

As an alternative method of heating a metallic elongated material induction heating has been proposed and employed to be replaced with the conventional furnace heating method. The proposed induction heating method is practiced in such a manner that the number of turns of a conductor is kept constant but voltage to be applied is variable, a feeding speed is variable or a clearance between the inductor and metallic elongated material is variable so as to achieve uniform heating over the whole length thereof. However it has been found that it is practiced only with much difficulties and after all satisfactory results fail to be obtained.

To obviate the drawback with the conventional heating methods as described above a special induction heating method was proposed and patented under Japanese Patnet Publication No. 30 570/1980.

This improved induction heating method of uniformly heating an elongated steel material over the whole length thereof consists in that when the steel material reaches a predetermined position it is detected by means of a suitable detector and then a movable heating coil moves forth and back across the heavy thickness section as if it rides thereon, while a fixed heating coil effects static heating without any movement, whereby uniform heating is ensured to a predetermined temperature. However it has been found that the above conventional induction heating method has still drawbacks, because when heating for instance a metal pipe having heavy thickness sections at both ends thereof, a temperature difference is caused between the end parts of the thin thickness section and other part of the same due to the fact that the former is heated at a temperature higher than that of the latter by way of thermal conduction from the heavy thickness sections with the result that it becomes impossible to achieve uniform heating, and moreover it has a considerable high thermal loss due to the movement of the movable heating coil. In some case where the metal pipe has an complex configuration it is difficult to effect heating.

Hence, it is an object of the present invention to provide a method and apparatus of properly induction heating a metallic elongated material having different thickness sections which is entirely free from the drawbacks with the conventional methods as described above. Specifically, the method of the invention consists in that the induction heating is continuously effected with the aid of an inductor while the metallic elongated material is displaced at a constant speed in the longitudinal direction, wherein the inductor is constructed such that the number of turns can be controlled as required and when the heavy thickness section of the metallic elongated material passes through the inductor, the effective number of turns is increased so as to ensure an increased thermal input, while when the thin thickness section passes therethrough, the effective number of turns is decreased so as to ensure a reduced thermal input, whereby the metallic elongated material is uniformly heated over the whole length thereof.

Specifically, the method of the invention is practiced with the aid of an inductor of which number of turns can be controlled as required in such a manner that when a stepped part of the metallic elongated material, that is, a boundary part intermediate a section having a heavy thickness (hereinafter referred to as heavy thickness section) and a section having a thin thickness (hereinafter referred to as thin thickness section) reaches a predetermined position it is detected by means of a suitable detector and then the detected signal is effective in increasing the number of turns of the inductor when the heavy thickness section passes therethrough, while decreasing the same when the thin thickness section does, whereby uniform heating is ensured over the whole length of the metallic elongated material by adequately controlling thermal power supply to the respective thickness sections.

DETAILED DESCRIPTION

Figure 1A:
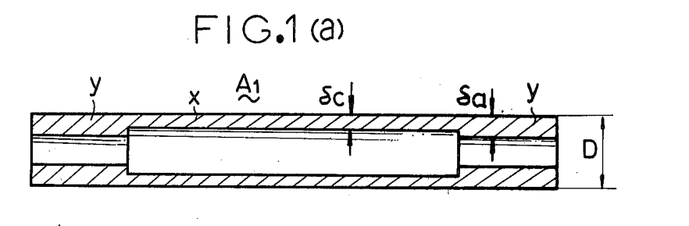
FIGS. 1(a), (b) and (c) are a longitudinal sectional views respectively which shows a few examples of metal pipe to be induction heated by the method of the invention.
Figure 1B:
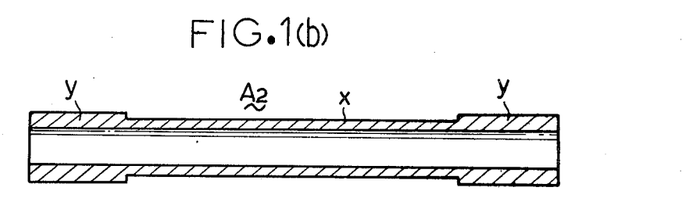
Figure 1C:
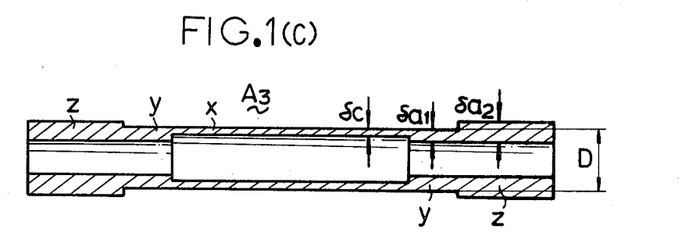

In FIGS. 1(a) to 1(c) three types of conventional metal tubes having different thickness sections in the longitudinal direction respectively are shown by way of sectional views, wherein FIG. 1(a) shows a metal pipe $A_1$ comprising a thin thickness section x and two heavy thickness sections y, the latter being located at both end parts of said thin thickness section x and having an increased thickness inward of the same, FIG. 1(b) does a metal pipe $A_2$ comprising a thin thickness section x and two heavy thickness sections y, the latter being located at both end parts of said thin thickness section x and having an increased thickness outward of the same, and FIG. 1(c) does a metal pipe $A_3$ comprising a thin thickness section x and two heavy thickness sections y with additional heavy thickness sections z, said heavy thickness sections y being located at both end parts of said thin thickness section x and having an increased thickness inward of the same, while said additional heavy thickness sections z having an increased thickness outward of the heavy thickness sections y. When heating a metal pipe of the abovementioned type with the aid of the conventional induction heating system, it is impossible to ensure uniform heating along the whole length of the pipe with constant power input and displacement speed, because there is a substantial difference in heat capacity of the thin and heavy thickness sections.

Generally, when successively heating a metal pipe by means of an inductor while the metal pipe moves at a constant speed in the longitudinal direction, a reached temperature is determined by the following equation.

$$T = \frac{P_o L t}{4.18 \, c\pi\delta(D - \delta) \, v} \quad (1)$$

where
- T: reached temperature of the heated pipe
- L: input power per unit length of the inductor
- t: heating time (time which elapses until a certain position on the tube has finished its passing through the inductor)
- c: specific heat
- $\delta$: thickness of the metal pipe
- D: outer diameter of the metal pipe
- v: displacement speed of the metal pipe When applying the above equation (1) to the metal pipe $A_1$ as shown in FIG. 1(a), the following equation will be established between heating time and thickness for both the thin thickness section x and heavy thickness section y.

$$\frac{t_a}{t_c} = \frac{\delta_a (D - \delta_a)}{\delta_c (D - \delta_c)} \quad (2)$$

where
- $t_a$: heating time for the heavy thickness section
- $t_c$: heating time for the thin thickness section
- $\delta_a$: thickness of the heavy thickness section
- $\delta_c$: thickness of the thin thickness section Thus, it is obvious from the above equation that in order to ensure uniform heating for the metal pipe having different thickness sections in the longitudinal direction heating should be effected for a period of time in approximate proportion to thickness of a certain section of the metal pipe to be heated, provided that input power $P_o$ per unit length of the inductor is constant. Now assuming that a pitch of the inductor coil is identified by reference symbol p, the number of turns of the inductor coil is by reference symbol N and more specifically the number of turn of the inductor coil for heating the heavy thickness section y and the thin thickness section x is identified by reference symbols $N_a$ and $N_b$, the equation (2) will be converted to the following one.

$$\frac{N_a}{N_b} = \frac{\delta_a (D - \delta_a)}{\delta_c (D - \delta_c)} \quad (3)$$

This is because of the fact that the following equations are obtainable, assuming that when heating the heavy thickness section y the length of the inductor is identified by reference symbol $L_a$, while when heating the thin thickness section x the length of the inductor is by reference symbol $L_c$.

$$t_a = \frac{L_a}{v} = \frac{pN_a}{v}$$

$$t_c = \frac{L_c}{v} = \frac{pN_c}{v}$$

Thus, it will be readily understood from the equation (3) that uniform heating for a metal pipe having different thickness sections can be effected by controlling the number of turns of the inductor.

To facilitate the understanding of the principle as described above it will be repeatedly described with respect to the following simple example.

Assumption is made such that the heavy thickness sections of the metal pipe have a thickness two times as much as that of the thin thickness section and the inductor is constructed of coils (a), (b), (c) and (d) each of which has 4 turns and is adapted to be turned on in conformance with a predetermined timing condition. Provided that electrical working conditions are previously determined such that the optimum heating is ensured when heating the metal pipe by means of the coil having two turns while it moves, a program will be prepared for the heavy thickness sections such that the latter passes through the coil having 4 turns. More specifically, a program is prepared for the respective coils (a), (b), (c) and (d) such that it turns on in conformance with the order of the coils (a), (b), (c) and (d) at the moment when the heavy thickness section of the metal pipe come close to them and then it turns off one after another at the moment when the tail end of the heavy thickness section leaves them.

The inductor as described above may be an independent coil. In practice it is practicable and economically preferable that each coil has 4 turns and an electrical circuit is provided such that ON-OFF control is freely programable for the respective turns. In this case the coil is located at a certain inclination relative to a metal pipe to be heated but no practical trouble will take place when the coil is arranged possibly close by the metal pipe, because magnetic flux tends to be concentrated on the heavy thickness section.

Now the present invention will be further described in greater details with reference to FIGS. 2(a) to (f) which illustrate an embodiment of the invention.

FIGS. 2(a) to (f) are a sectional view respectively which illustrates how the metal pipe $A_3$ in FIG. 1(c) is induction heated in accordance with the method of the present invention. In view of easier understanding of the method of the invention the metal pipe A to be heated is designed in the substantially same configuration as the metal pipe $A_3$ in FIG. 1(c) with an outer diameter D which is very large in comparison with a thickness $\delta$. Now the above equation (3) is represented by the following equations;

$$\frac{N_a}{N_c} \approx \frac{\delta_a}{\delta_c} \quad (D >> \delta) \quad (4)$$

Further, the metal pipe A is designed much that the heavy thickness sections y and z have thickness $\delta_{a1}$ and $\delta_{a2}$ substantially larger than the thickness $\delta_c$ of the thin thickness section, said thickness $\delta_{a1}$ being 1.5 times as large as the thickness $\delta_c$, while said thickness $\delta_{a2}$ being 2 times as large as the thickness $\delta_c$, whereas the inductor I comprises a coil having 20 turns.

Now the number $N_{a1}$ of turns of the inductor I for heating the heavy section y as well as the number $N_{a2}$ of turns of the inductor I for heating the heavy section z of the metal pipe A are calculated from the equation (4) as follows.

$$N_{a1} = \frac{\delta_{a1}}{\delta_c} N_c = 1.5 \, N_c \quad (5)$$

-continued $$N_{a2} = \frac{\delta a2}{\delta c} N_2 = 2 N_c \qquad (6)$$

Thus, it will be readily understood from the above equations that the thin thickness section x of the metal pipe is heated by means of the coil having 10 turns, while the heavy thickness section y and the heavy thickness section z are heated by means of the coils having 10 turns, while the heavy thickness section y and the heavy thickness section z are heated by means of the coils having 15 turns and 20 turns respectively, assuming that the inductor I comprises a coil having 20 turns. It is to be noted that in the drawing the inductor I is identified by 20 small circles, wherein those ones fully colored with black represent coil turns through which electric current flows, while the other ones do coil turns having no electric current, and that reference numerals 1 to 10 designate a coil turn respectively which is intended to heat the heavy thickness sections y and z of the metal pipe.

Now a method for controlling the number of turns of the inductor will be described below on the assumption that the above working conditions have been established.

Figure 2:
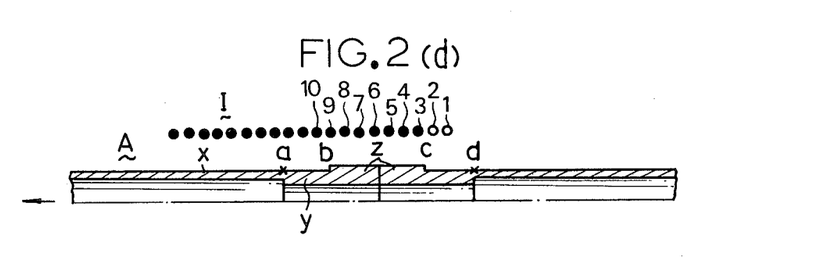
Figure 2A:
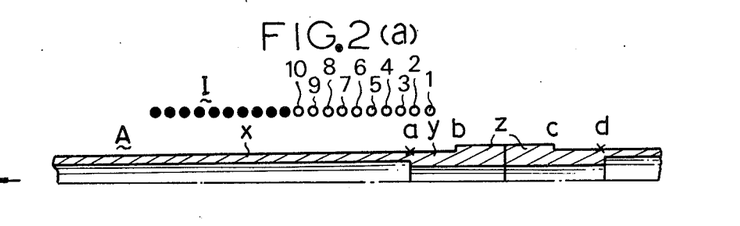
FIGS. 2(a), (b), (c), (d), (e) and (f) are a partial sectional view of the metal pipe and inductor respectively which illustrates how ON-OFF control is effected to the metal pipe which is displaced to the left.
Figure 2B:
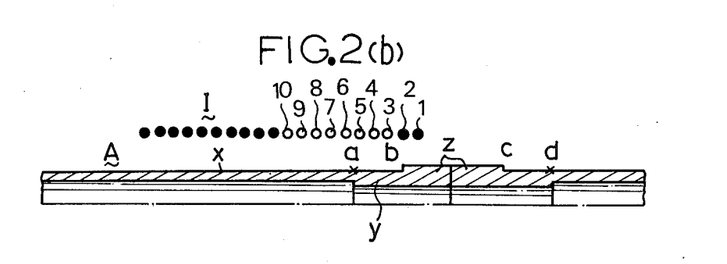
Figure 2C:
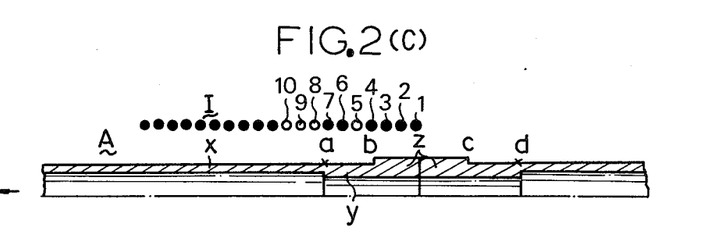

First, as illustrated in FIG. 2(a), a metal pipe A is displaced at a constant speed in the leftward direction as indicated with an arrow mark in the drawing, provided that electrical working condition have been provided so as to heat the thin thickness section x to a predetermined temperature using coils other than those identified by reference numerals to 10. The metal pipe A is heated while it is displaced, and when the point b on the heavy thickness section z comes close by the coils having no electric current, as illustrated in FIG. 2(b), they are successively turned on in conformance with the order of the reference numerals 1 to 5. In the meanwhile, as the point a on the heavy thickness section y comes close by the coil 6, as illustrated in FIG. 2(c), the latter is turned on. As the metal pipe A is displaced, the coils designated by the reference numerals 7 to 10 are turned on one after another. Then, when the rear end point c on the heavy thickness section z leaves the coil 1, as illustrated in FIG. 2(d), the coils are turned off in conformance with the order of the reference numerals 1 to 5. Further, when the rear end point d on the heavy thickness section y leaves the coil 6, as illustrated in FIG. 2(e), the coils are turned off in conformance with the order of the reference numerals 6 to 10 in the same manner as in the foregoing. After completion of heating with the aid of the coils 1 to 10 which were subjected to the ON-OFF control as described above, heating continues to be effected only with 10 turns of inductor coils other than the coils 1 to 10, as illustrated in FIG. 2(f). When the metal pipe leaves the end portion of the inductor, one cycle of induction heating is finished. By repeating the above steps of operations it is ensured that a lot of metal pipes having different thickness sections are uniformly induction heated over the whole length thereof.

It should be of course understood that the invention has been described above with respect to metal pipes having different thickness sections but it is not limited only to them and that it may be applied to any cylindrical metallic material such as rod or the like having different diameter sections.

Since the method of the invention is practiced in the above-described manner, it is ensured that any metal pipe having different thickness sections such as oil well drilling pipe or the like can be very easily induction heated uniformly over their whole length without any necessity for displacement of the inductor only by way of program controlling of the variable capacity of the inductor coils, provided that a thickness ratio of the thin thickness section to the heavy thickness section as well as an extending area where the heavy thickness sections are located are previously known. As a result a number of industrial advantages are provided by the method of the invention.

Figure 3:
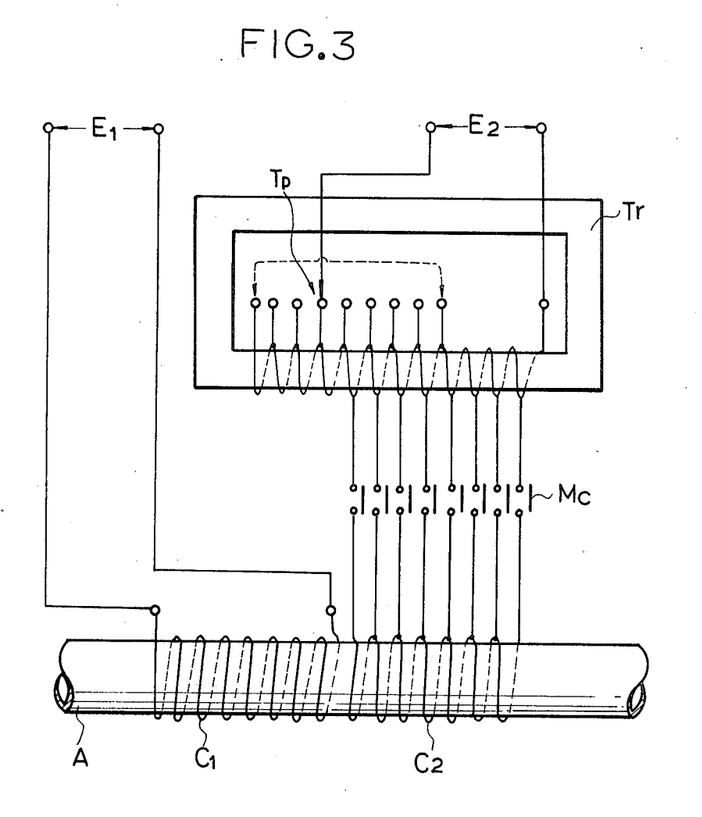
FIG. 3 is a schematic illustration of an example of induction heating apparatus by means of which the method of the invention is effectively practiced.

Finally, FIG. 3 shows an example of induction heating apparatus by means of which the method of the invention is effectively practiced, wherein the induction heating apparatus comprises a fixed coil $C_1$ and a variable coil $C_2$, the former being intended to heat the thin thickness section, while the latter being intended to heat the heavy thickness section. The variable coil $C_2$ is constructed such that the number of turns can be controlled with the aid of a switch $M_c$, whereby in case of a single power supply source for the intended induction heating ($E_1 = E_2$) voltage to be applied by one turn of the variable coil $C_2$ can be controlled by shifting the tap $T_p$ of the autotransformer $T_r$ to the position as illustrated by dotted lines, while in case of two power supply sources for the same purpose where the output voltages $E_1$ and $E_2$ can be controlled as required respectively input power per unit length of the inductor is controlled by controlling the voltage $E_2$ at the variable coil $C_2$ and at the same time temperature control is effected in accordance with the equation (1). Thus, it will be obvious that the method of the present invention can be practiced with the aid of the induction heating unit as described above without difficulty.

Figure 4:
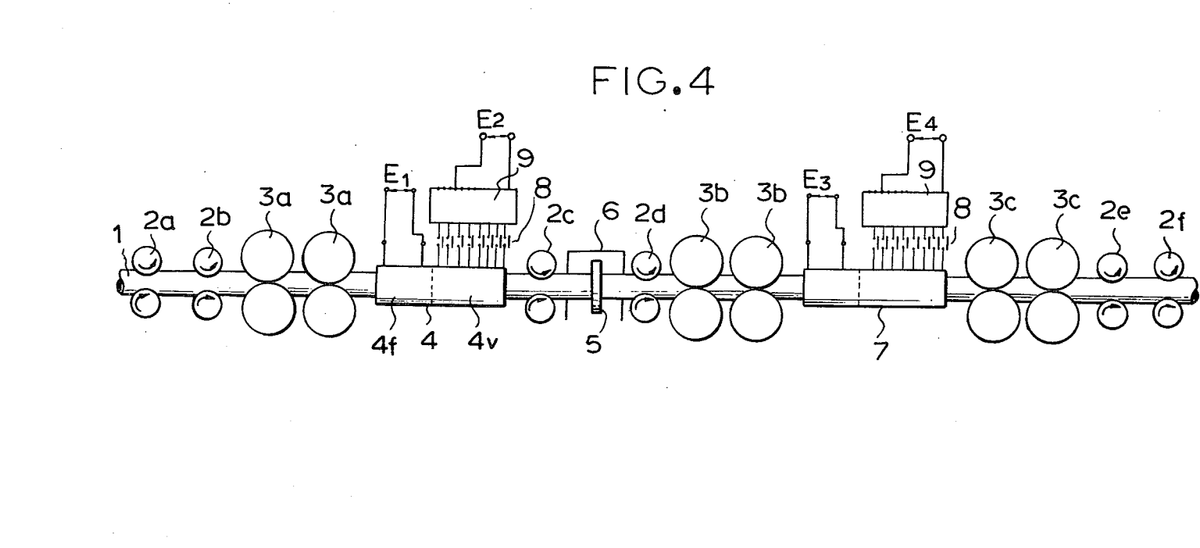
FIG. 4 is a schematic illustration of an example of apparatus of the invention.

Further, an example of apparatus to execute the present invention as follows referring to FIG. 4.

Pipe 1 being fed into pinch-roller 2a, 2b is guided with straightening-rollers 3a—3a. A set of variable-turn-inductor based on the present invention is equipped at the down stream of rollers 3a—3a by which pipe 1 is heated uniformly even though there may be remarkable local change of pipe wall thickness or some change of outside pipe diameter.

These pinch and straightening-rollers are so arranged that distance of each two opposite shafts of rollers are to be changed properly in order to adapt rollers smoothly to the pipe even if there should be some steep change of outside pipe diameter while pipe 1 is fed through rollers.

A set of inductor 4 is constructed as shown in FIG. 3 and the number of effective turns are increased or decreased automatically in relation to the pipe wall thickness coming into the inductor 4 to be heated.

Change of turn is operated with switches 8 and in this case there are 8 switches equipped. Here, it is interresting that these switches are fairly compact because of small voltage difference inspite of large value of electric currents, and then normal ON-OFF type magnetic switches or semi-conductor type ones are to be available. In FIG. 4 another set of similar inductor is equipped at the down stream of pinch-roller 2c, 2d, 3b—3b, and besides an water cooling jacket 5 is installed between pinch-roller 2c and 2d and is covered with shelter 6 to prevent splash of cooling water or cooling liquid.

It must be noted that each heating inductor 4 or 7 is equipped with a pare of straightening roller-units located at the front and the rear of each inductor 4 or 7 in order to prevent deformation of pipe 1.

Speed of feeding pipe 1 is given with pinch-rollers 2a, 2b, - - - 2e, 2f driven with a variable-speed-motor and is kept constant.

Heating power is controlled by adjusting voltage $E_1$ of fixed turn inductor 4f which is a part of inductor 4 and by controlling number of turns of variable-turn-inductor 4 v which is also a part of inductor 4. Voltage $E_2$ of inductor 4f is kept constant while number of turns are changed, and then pipe 1 is heated uniformly up to required quenching temperature and then quenched by cooling liquid at jacket 5 and then heated again properly to operate temper.

And here after, heat treated pipe 1 is fed out with sets of pinch-roller 2e, 2f and so on. .

The apparatus of the present invention is made compact because of reasonable structure and mechanism of heating unit 4-8-9 and 7-8-9 and besides it requires no moving part except each roller shafts and then the apparatus is comparatively cheap, its life is very long, and its operation is very correct and stable. But it must be noted too, that second heater 7 may be changed to normal type heater such as fixed turn inductor or furnace because holding time is long and there is some large allowable range of heating temperature, and this construction would make the apparatus cheaper.

What is claimed is:

1. In a method of inductively heating elongated metallic material in which the elongated metallic material is passed axially through the coils of an induction heater in a continuous motion at a uniform speed and in which the axial dimension of the induction heater is small relative to the axial dimension of the metallic material, the improvement by which the uniform heating of the metallic material over the length thereof is achieved despite significant variations in the cross-sectional area of the metallic material over the length thereof, comprising the steps of:
   (a) providing a coil with multiple axially spaced turns; and
   (b) selectively applying an electric current to the individual turns of the coil in synchronism with the passage of the metallic material therethrough to thereby selectively vary the ratio which (i) the time each successive cross-sectional area of the metallic material entering the coil is in heating proximity to a turn thereof through which current is applied bears to (ii) the total time necessary for such cross-sectional area to pass entirely through the coil, and thus vary the heating of each such cross-sectional area as a function of its area.

2. The method of claim 1 including the further steps of:
   (c) detecting the cross-sectional area of the metallic material in proximity to the entrance end of the coil; and
   (d) applying current to the individual turns of the coil responsively to the detection
   whereby the selective application of current to the individual turns of the coil need not be predetermined.

3. The method of claim 2 wherein the cross-sectional area is magnetically detected.

4. The method of claim 1 including the further steps of:
   (c) providing a program as a function of the predetermined cross-sectional area of the metallic material to be heated; and
   (d) applying current to the individual turns of the coil in response to the program.

5. The method of claim 1 wherein the heated metallic material is cooled and thereafter reheated to provide the desired tempering.

6. In apparatus for inductively heating elongated metallic material including a plural turn coil having an axial dimension small relative to the axial dimension of the metallic material, means for applying an electric current to the coil, and means for continuously advancing the metallic material axially through the coil at a constant speed, the improvement by which the uniform heating of the metallic material over the length thereof is achieved despite significant variations in the cross-sectional area of the metallic material over the length thereof:
   wherein the turns of said coil are axially spaced; and
   wherein said means for applying electric current top said coil includes switch means for selectively applying said electrical current to the individual turns of said coil in synchronism with the passage of the metallic material therethrough
   to thereby selectively vary the ratio which (i) the time each successive cross-sectional area of the metallic material entering the coil is in heating proximity to a turn thereof through which current is applied bears to (ii) the total time necessary for such cross-sectional area to pass entirely through the coil, and thus vary the heating of each such cross-sectional area as a function of its area.

7. The apparatus of claim 6 including means for detecting the cross-sectional area of the metallic material in proximity to the entrance end of said coil,
   said switch means being responsive to said detecting means.

8. The apparatus of claim 6 including a switch control program related to the variation in the cross-sectional area of the metallic material to be heated over the length thereof, said switch means being responsive to said program.

9. Apparatus for uniformly heating an elongated metallic material having a non-uniform cross-sectional area comprising:
   a source of electric current;
   an induction coil having a plurality of axially spaced turns;
   programmable switch means for selectively connecting said source to said turns;
   means for moving elongated magnetic material through the axis of said coil; and
   means for programming said switch means so that the number of current carrying turns of said coil to which a given cross-section of the magnetic material is exposed as it is moved through said coil is a function of the area of such cross-section and the speed of movement of the metallic material.

10. The apparatus of claim 9 including
   a second source of electric current; and
   a second induction coil having a plurality of axially spaced turns, said second coil being disposed coaxially with said first mentioned coil adjacent thereto so that metallic material to be heated is moved therethrough; and
   a second switch means for selectively connecting said second source to said second coil
   whereby said second coil induces a uniform amount of heat to each cross-sectional area of the metallic material passed therethrough without regard to variations in the area thereof.

11. The apparatus of claim 10 wherein the amount of heat induced by said second coil is a function of the minimum cross-sectional area of the metallic material to be heated.

12. The apparatus of claim 9 wherein said means for programming said switch means includes means for detecting the cross-sectional area of the metallic material adjacent to the entrance end of said coil whereby said switch means is programmed by the movement of the metallic material into said coil.

13. The apparatus of claim 9 including:
means for cooling the metallic material after the movement thereof through said coil; and
means for thereafter reheating the metallic material.

14. The apparatus of claim 9 wherein said metallic material moving means moves the material at a predetermined constant speed.

* * * * *